Aug. 28, 1956

C. F. NORRIS

2,760,426

DISPENSING DEVICE

Filed Aug. 15, 1952

INVENTOR.
COMA F. NORRIS
BY Fulwider and Mattingly
ATTORNEYS

Aug. 28, 1956  C. F. NORRIS  2,760,426
DISPENSING DEVICE
Filed Aug. 15, 1952  7 Sheets-Sheet 4

INVENTOR.
COMA F. NORRIS
BY Fulwider and Mattingly
ATTORNEYS

Aug. 28, 1956  C. F. NORRIS  2,760,426
DISPENSING DEVICE
Filed Aug. 15, 1952  7 Sheets-Sheet 6

INVENTOR.
COMA F. NORRIS
BY Fulwider and Mattingly
ATTORNEYS

Fig. 18

United States Patent Office 2,760,426
Patented Aug. 28, 1956

2,760,426

DISPENSING DEVICE

Coma F. Norris, Westminster, Calif.

Application August 15, 1952, Serial No. 304,566

2 Claims. (Cl. 99—354)

My present invention relates to the field of vending devices, and more particularly to a vending machine which after actuation, automatically cooks and dispenses a predetermined quantity of food products.

In the past, fried food products such as doughnuts have normally been prepared by a process embodying a sequence of manual operations. The method of preparing doughnuts included the mixing and rolling of the dough, the cutting and forming of the doughnuts from the dough, and the frying of the doughnuts in a bath of hot fat. However, the description of a preferred form of my present invention is directed to an automatic doughnut vending machine which cooks and dispenses doughnuts in a manner whereby fresh doughnuts may be dispensed as required without employing the old-fashioned complex manual operations.

From either a commercial or domestic standpoint, the old method of preparing doughnuts had a number of disadvantages, the most obvious of which were the necessity of mixing the dough in relatively large quantities, and the time required in the actual cutting and frying of the doughnuts. Thus, because doughnuts must normally be prepared in large quantities from the standpoint of economy, it is not always possible to have a supply of freshly cooked doughnuts on hand.

A further disadvantage of previous commercial methods of preparing doughnuts lies in the personnel required for the preparation and sale thereof. In the average bakery operation one person is employed to mix and cut the dough, another to fry the doughnuts, and a third person for handling the cooked doughnuts in either the delivery or sale thereof.

A major object of my present invention is to provide a portable, compact vending machine which eliminates the above mentioned disadvantages in the preparation of doughnuts, that may be disposed in any desired location, and one that will automatically cook and dispense a predetermined quantity of freshly fried doughnuts when actuated.

Another object of my invention is to supply a food vending device of relatively simple mechanical structure that may be readily fabricated from standard commercially available materials, requires a minimum of maintenance attention, and one that is so simple to operate that it may be serviced by a person having little or no mechanical ability.

Yet another object of my invention is to supply a food vending machine adapted to be either coin-actuated or manually operated to fry doughnuts or other foods in a hot grease bath and dispense same when cooked.

A still further object of my invention is to furnish a food vending device of attractive appearance, one that occupies a relatively small amount of floor space, and one embodying unusual customer sales appeal in that the actual sequence of the cutting, frying and dispensing of the food may be witnessed by the customer.

These and other objects and advantages of my invention will become apparent from the following description of a preferred form thereof, and from the drawings illustrating that form in which.

Figure 1:
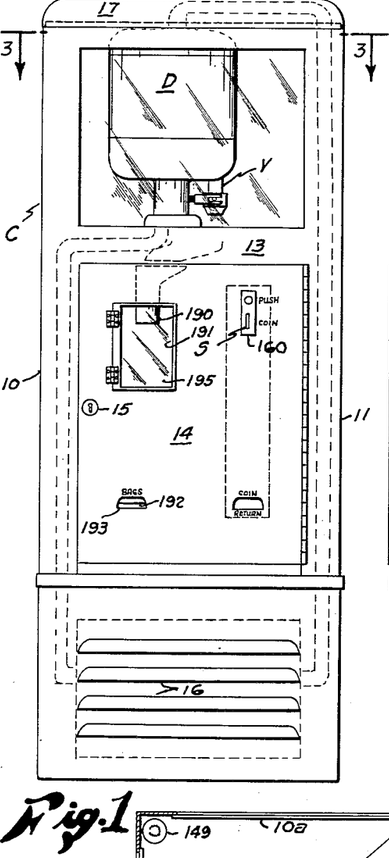
Figure 1 is a front elevational view of my food vending device.
Figure 2:
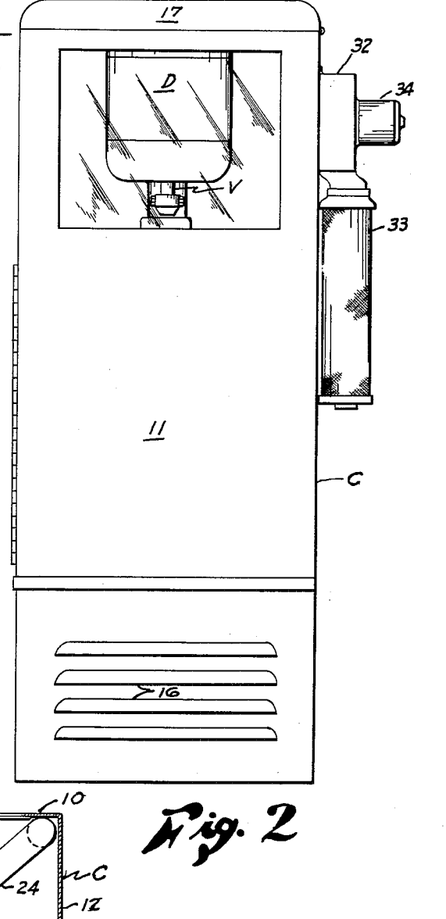
Figure 2 is a side elevational view of the device showing the depth thereof.
Figure 3:
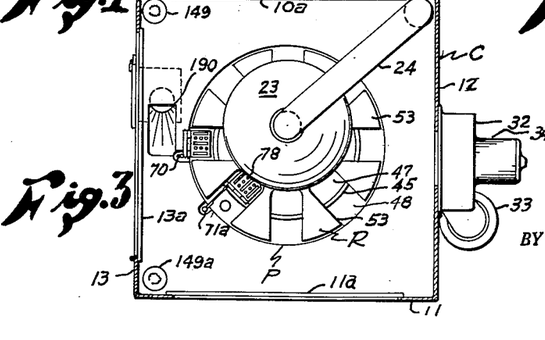
Figure 3 is a horizontal cross-sectional view of the device taken on the line 3—3 of Figure 1.

Referring now to the drawings for the general arrangement of my invention, it will be seen that it includes a cabinet C. It will be apparent that the cabinet C may take various forms, but the form shown in Figures 1, 2 and 3 of the drawings has been found from experience to be highly satisfactory. A dough container D is disposed in substantially the upper third of the cabinet, and normally is of a size to hold sufficient dough that it need not be charged more than once each day. Dough is discharged from the container D in a doughnut shape, or other desired form, through a valve mechanism V, the details and mechanical structure of which are shown in Figures 14 to 17 inclusive. As the doughnuts are discharged from the valve V, they are deposited in a bath of heated fat contained within the confines of a heated pan P. The doughnuts so discharged from the valve V are moved through a predetermined path in the hot fat by rotation of a plate R and auxiliary mechanisms associated therewith. Details of plate R and the auxiliary mechanism therefor may best be seen in Figures 11, 12 and 13.

Figure 4:
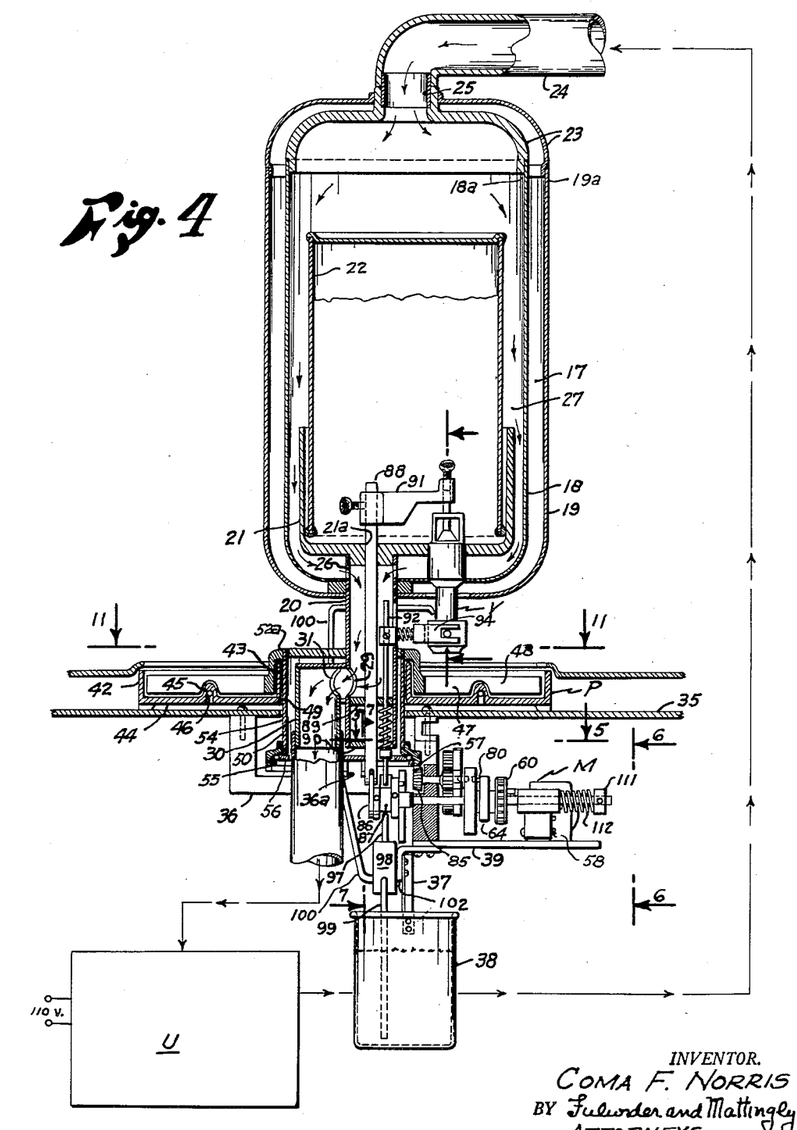
Figure 4 is a vertical cross-sectional view of the dual storage compartment of my invention and the doughnut frying mechanism thereof.

When the dough is disposed within the confines of container D it is maintained at a predetermined temperature by means of an air conditioning unit U which circulates cooled air through a duct system shown in Figure 4.

My invention is preferably coin operated. When a coin is deposited in a slot S positioned in the front of cabinet C (Figure 1), the vending machine is actuated. After the coin passes downwardly through the slot it completes a portion of an electrical circuit E which is disclosed in detail in Figure 18. Energization of this portion of circuit E actuates the apparatus to perform its intended functions, namely that of forming, frying, and dispensing a predetermined quantity of doughnuts. Although the device shown in the drawings is coin operated, it will be understood that it is adaptable for manual operation as well.

The cabinet C is preferably formed in a generally rectangular shape and comprising sheet metal side panels 10 and 11, a rear panel 12, and front panel 13. As may best be seen in Figure 1, panel 13 is provided with a hinged door 14 normally maintained in a closed position by a suitable lock 15. When in the open position, door 14 permits access to the interior of the cabinet C for maintenance purposes.

Panels 10, 11, 12 and 13 each have louvres 16 formed in the lower portion thereof to permit dissipation of heat given off by the air conditioning unit U when in operation, which unit is preferably positioned in substantially the lower third of cabinet C. A substantially rectangular cover 17 is provided, hinged or otherwise movably supported from the upper portion of rear panel 12, and when disposed in a horizontal position on cabinet C, it closes the open upper end thereof. The upper portions of panels 10, 11, and 13 are cut away to form generally U-shaped frames in which transparent panes 10a, 11a, and 13a may be removably disposed. By means of transparent panes 10a, 11a, and 13a, an onlooker may witness each step of the cooking operation. Cover 17 and panes 10a, 11a and 13a cooperate to completely enclose the upper portion of cabinet C, and as a result, escape of the cooking fumes from within the confines of the cabinet is prevented.

The detailed mechanical structure of the dough-holding container D may best be seen in Figure 4. Two cylindrically shaped vessels 18 and 19 are concentrically disposed relative to one another so as to provide an annular shaped air space 17 therebetween for heat insulation purposes. Vessels 18 and 19 are supported in a substantially vertical position on a tube 20 that extends upwardly through the bottoms thereof. Tube 20 terminates on the upper end in a cylindrically shaped receptacle 21 disposed within the confines of vessel 18. The valve V is in communication with the interior of receptacle 21, and depends downwardly therefrom to pass through the lower portions of vessels 18 and 19 (see Figure 4). Dough of the proper consistency is preferably delivered to the invention in a cylindrical container 22, which when the lid (not shown) is removed therefrom, may be placed in an inverted position with the open end thereof disposed within the confines of receptacle 21.

The open ends 18a and 19a of the two vessels are closed by a double walled cover 23 that slidably engages the extreme upper inner surfaces of the vessels. A flexible air conditioning conduit 24 is connected to an aperture 25 formed in substantially the center of cover 23. The air conditioning unit U discharges cooled air upwardly through conduit 24, and may be any one of a number of air conditioning units commercially available for such purposes. The lower end of unit U is preferably connected to the discharge of conduit 24. As cooled air is discharged from aperture 25 it flows downwardly in the annular air space 27 formed between the vessel interior and the exterior surface of the dough container 22 and receptacle 21. When the cooled air reaches the lower portion of vessel 19, it is discharged therefrom through an opening 26 formed in tube 20, with the air then passing downwardly in the tube to an aperture 29 formed therein. After discharge from tube 20 through aperture 29, air enters a second tube 30 through an opening 31 provided therein, and returns to the air conditioning unit U for further cooling, as may best be seen in Figure 4. An exhaust fan 32 is mounted in a suitable opening formed in the upper portion of the rear panel 12 (Figure 2), and serves to direct air and cooking fumes from the upper portion of cabinet C into a container 33. By means of a suitable porous agent disposed in container 33, all objectionable odors are removed from the air before it is discharged from the cabinet C. The fan 32 is actuated by an electric motor 34 preferably disposed in the position shown in Figure 2.

As best seen in Figure 4, a horizontally disposed base plate 35 is supported by conventional fastening means within the confines of cabinet C from the interior surfaces of side panels 10, 11, and rear panel 12, and defines the lower limits of substantially the upper third portion of cabinet C. An L-shaped bracket 36 extends downwardly from plate 35, and serves to support the second tube 30. A second bracket 37 likewise depends downwardly from plate 35 to support a grease-containing receptacle 38 mounted on the lower end thereof. An arm 39 extending outwardly from bracket 37 serves to support a mechanism M, the function of which will be described in detail hereinafter.

The pan P is disposed on the upper surface of base 35 and supported thereby. The pan comprises inner and outer side walls 42 and 43 respectively, with the lower portions of the walls connected by a horizontally disposed bottom 44, preferably cast as an integral unit from aluminum or other material having good heat conducting qualities. Bottom 44 is formed with a circular rib 45 of inverted U-shaped cross section that is intermediately disposed between side walls 42 and 43, dividing the pan P into two concentric annulus shaped sections. A circular heating element 46 is disposed within the confines of rib 45. The rib 45 not only serves as a shield for preventing contact of the grease with heating element 46, but also serves to define two annular channels 47 and 48, the substantial length of which the doughnuts must travel during the frying operation, as will hereinafter be described. The pan wall 43 defines a vertical annular opening 49 that is in vertical alignment with an opening 50 of like cross section formed in plate 35.

Figures 11, 12, 13:
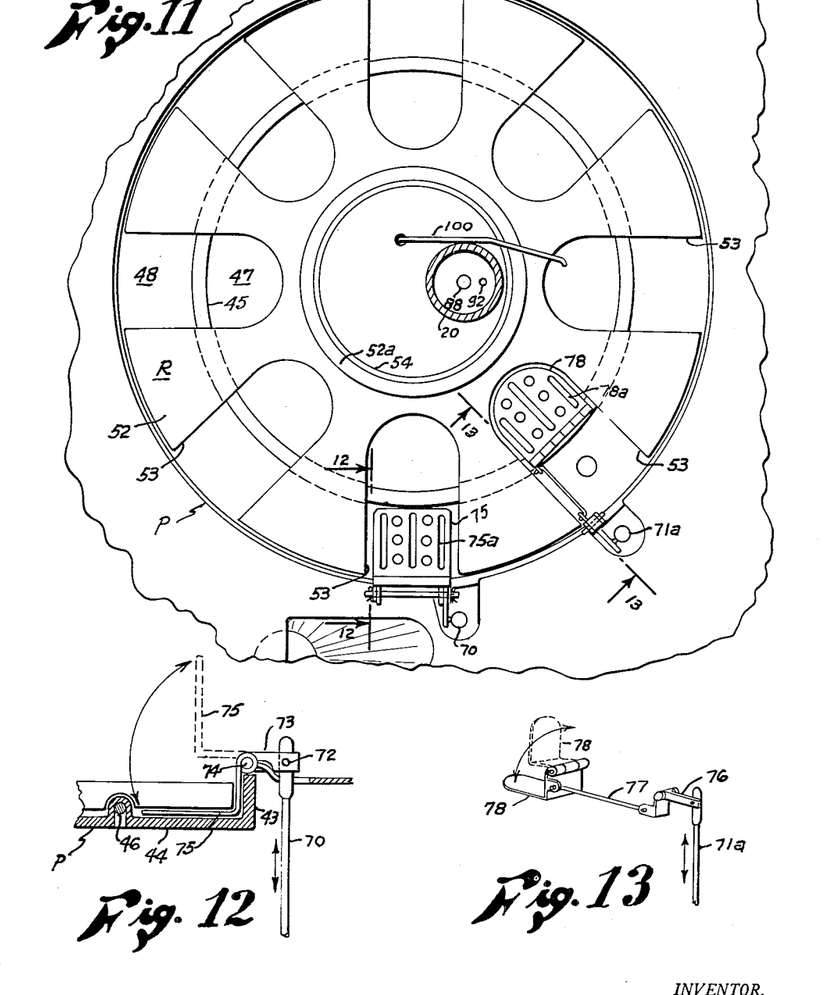
Figure 11 is a plan view of the rotating plate used in moving the doughnuts during the frying operation, taken on line 11—11 of Figure 4.
Figure 12 is a vertical cross-sectional view of a portion of the doughnut removing basket shown in Figure 11, taken on line 12—12 thereof.
Figure 13 is a perspective view of the doughnut transferring basket shown in Figure 11, taken on line 13—13 thereof.

The doughnut moving plate R is of annular construction and has a number of radially disposed slot-like openings 53 extending inwardly from the periphery thereof (see Figures 11 and 4). The plate R is situated in the pan P with the upper face thereof occupying a position just below the level of the grease contained therein. Plate R is preferably formed with an integral centrally disposed annular flange 52a which may be welded, brazed, or otherwise affixed to the upper portion of a tubular shell 54 serving as a rotatable support for the plate. The lower end of shell 54 is rotatably supported on ball bearings 55 mounted on a suitable horizontally disposed member 56. In Figure 4 it will be seen that member 56 is maintained in the desired position by an upwardly projecting portion 36a of bracket 36. Shell 54 is provided on the lower portion thereof with a ring gear 57 which when rotated, results in the actuation of the doughnut moving plate R.

Figures 5, 8, 9, 10:
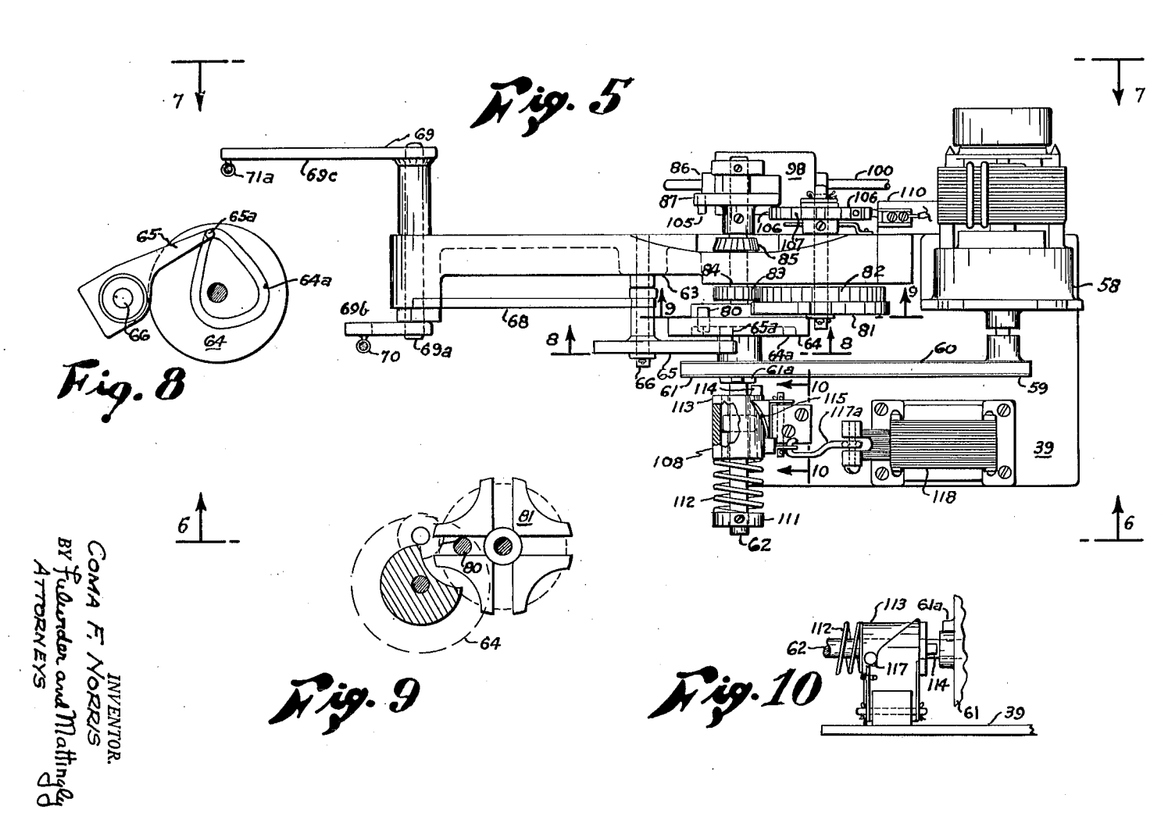
Figure 5 is a horizontal cross-sectional view of a portion of the actuating mechanism taken on the line 5—5 of Figure 4.
Figure 8 is a side elevational view of the basket actuating cam used in the device taken on line 8—8 of Figure 5.
Figure 9 is a side elevational view of the Geneva movement member which when actuated, imparts intermittent rotation to the doughnut moving plate, taken on line 9—9 of Figure 5.
Figure 10 is a side elevational view of the dog clutch mechanism used in actuating the doughnut-forming valve, taken on the line 10—10 of Figure 5.
Figure 6:
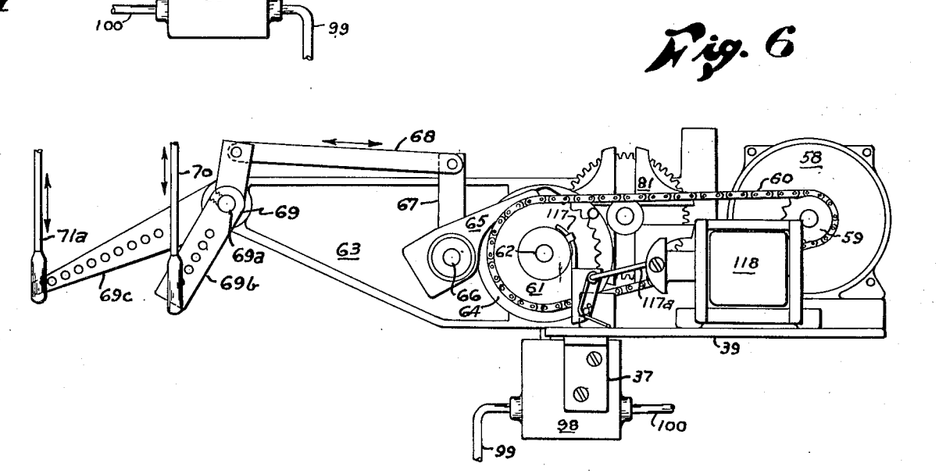
Figure 6 is a side elevational view of a portion of the actuating mechanism taken on the line 6—6 of Figure 4 and Figure 5.

Ring gear 57 rotates when mechanism M is actuated, as may best be seen in Figures 6 to 10 inclusive. In Figures 5 and 6 it will be seen that a motor 58 drives a sprocket gear 59 which engages an endless chain link belt 60. Belt 60 engages a sprocket gear 61 rotatably mounted on a shaft 62, which is transversely supported in an elongate frame 63. Sprocket gear 61 is keyed to a cam 64 as seen in Figure 8. Cam 64 is provided with a slot 64a that is movably engaged by a pin 65a mounted on a follower 65, which is pivotally supported on a shaft 66 mounted in frame 63. Follower 65 actuates an upwardly extending lever 67, which in turn is movably connected by a link 68 to a bell crank 69. The bell crank 69 is pivotally supported on a shaft 69a that is journaled in a transverse position in frame 63. An arm 69b of the bell crank is pivotally connected to an upwardly extending rod 70, and a somewhat longer bell crank arm 69c is pivotally connected to an upwardly extending rod 71a.

The rod 70 is pivotally connected on its upper end by a pin 72 to an arm 73, which is rotatably mounted on a shaft 74 affixed to the upper edge of pan P. An L-shaped basket 75 extending downwardly and inwardly from arm 73, alternately moves between the position shown in phantom lines and that shown in solid lines in Figure 12, as rod 70 is reciprocated by the action of mechanism M. The basket 75 removes doughnuts from the grease contained in the pan at synchronized intervals in a manner to be described in detail hereinafter. Rod 71a extends upwardly to a bell crank 76 pivotally connected by a rod 77 to a second rotatably supported basket 78 which transfers doughnuts from inner channel 47 after traversing substantially the length thereof to the outer channel 48 of the pan P. Baskets 75 and 78 have slots 75a and 78a respectively formed therein that permit drainage of grease from the doughnuts when the baskets are raised above the grease bath.

As shown in Figure 5, the cam 64 has a pin 80 that projects outwardly from the inwardly disposed face thereof. Upon rotation of cam 64, pin 80 engages a slotted Geneva movement member 81 illustrated in Figure 9, to advance the member 81 one-quarter of a revolution. Each time member 81 is so advanced, a gear 82 affixed thereto is intermittently rotated through part of a revolution. Gear 82 engages a pinion 83 rotatably mounted on shaft 62, the gear 83 being connected by a key or collar 84 to a second pinion 85 also rotatably mounted on shaft 62. Pinion 85 is in constant engagement with ring gear 57, and each time the Geneva movement member 81 is actuated, the doughnut moving plate R advances sufficiently to so position two openings 53 that baskets 75 and 78 may pivot vertically therein and thus perform their intended functions. It will be particularly noted that baskets 75 and 78, in association with moving plate R, operate concurrently with this portion of mechanism M, in contrast to the intermittent operation of valve V and the portion of mechanism M to be hereinafter described.

Figure 7:
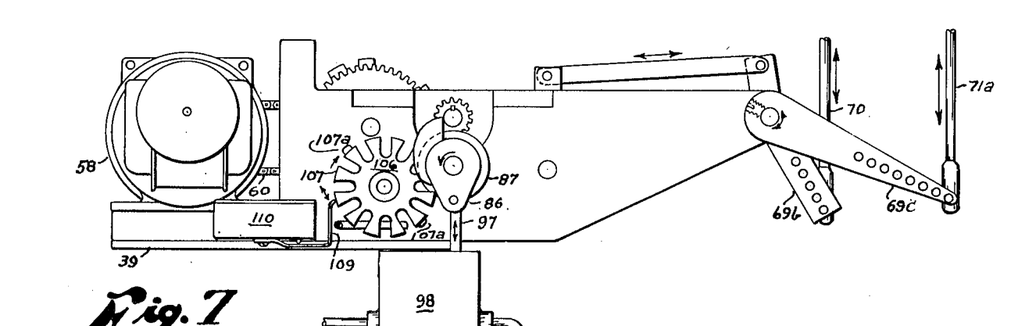
Figure 7 is a side elevational view of the opposite side of the actuating mechanism taken on line 7—7 of Figure 5.
Figure 14:
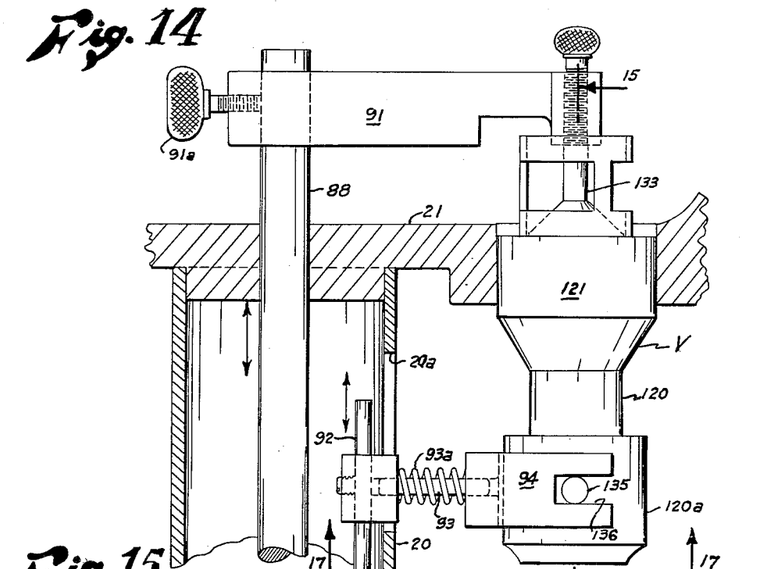
Figure 14 is an enlarged fragmentary side elevational view of the mechanism which actuates the doughnut forming valve.

Shaft 62 operates intermittently, and has two cams 86 and 87 mounted on one end thereof (see Figures 4 and 7). Cam 86 movably engages the lower slotted end of an upwardly extending rod 88 that is supported for reciprocatory motion in bores formed in two vertically spaced plates 89 and 90 disposed in the lower portion of tube 20. As seen in Figure 14, the upper portion of rod 88 is disposed in tube 20 and extends upwardly within the confines of receptacle 21 through a bore 21a formed in the bottom portion thereof. A vertically adjustable horizontal arm 91, preferably provided with a thumb screw 91a, is mounted on the upper end of rod 88 and terminates at its outer end directly over valve V. The lower end portion of a spring-loaded rod 92 movably engages cam 87. Rod 92 is disposed adjacent and parallel to rod 88 extending upwardly within tube 21, and has an outwardly extending arm 93 mounted on the upper portion thereof. Arm 93 projects outwardly through a vertical slot 20a formed in tube 21 and has a semi-circular jaw 94 movably mounted thereon that is at all times urged outwardly by a helical spring 93a to actuate a portion of valve V, as will be further explained hereinafter.

As it rotates cam 87 engages a spring-loaded rod 97, which as it is reciprocated, causes a pump 98 to draw fluid grease upwardly from receptacle 38 through a conduit 99. The withdrawn grease is discharged by the pump through a second conduit 100 onto the lower portion of valve V for lubrication purposes. That portion of the discharged grease not adhering to valve V drops downwardly into pan P, serving to replenish the grease lost through evaporation and by absorption during the cooking operation. Pump 98 is supported by an L-shaped bracket 102.

In order that valve V will only form and discharge a predetermined number of doughnuts into pan P when the machine is actuated, the cam 87 is provided with a pin 105 projecting outwardly therefrom for engaging a second Geneva movement toothed member 106 each time the cam makes one revolution. Member 106 is advanced the width of one of its teeth 107 by each revolution of pin 105, and one doughnut is discharged into the pan upon completion of each revolution of pin 105 and advancement of member 106. Member 106 has two spaced teeth 107a that extend outwardly further than the balance of the teeth, and when one of these teeth (107a) engages the actuating lever 109 of micro-switch 110, the electrical circuit governing that portion of mechanism M of valve V is broken, causing the valve to stop operating.

The intermittent rotation of shaft 62 for actuation of valve V is accomplished by a dog clutch 108, as may best be seen in Figures 5 and 10. This clutch includes a collar 111 rigidly affixed to shaft 62. A helical spring 112 that is at all times in compression, encircles shaft 62 and extends inwardly from collar 111 to a cylindrically shaped clutch member 113. The clutch member 113 is rotatably supported on shaft 62 and has a dog 114 on the inwardly disposed face thereof adjacent to the sprocket 61. The ends of spring 112 may be either permanently or removably affixed to collar 111 and clutch member 113. When the spring 112 is permitted to move member 113 inwardly, the dog engages the outwardly extending lug 61a of sprocket 61 to cause rotation of shaft 62.

Clutch member 113 has a longitudinally extending curved groove 115 formed on the outer face thereof that is engaged by a pivotally supported lever 117, the position of which is controlled by an electric solenoid 118. When solenoid 118 is energized, lever 117 is pivoted outwardly by movement of a link 117a so as not to engage the groove 115, and spring 112 moves clutch member 113 inwardly to be driven by sprocket 61. After a predetermined quantity of doughnuts have been discharged by valve V due to actuation of shaft 62, one of the teeth 107a of the Geneva movement member 106 momentarily opens the micro-switch 110 to break the energizing circuit of solenoid 118. Thereupon lever 117 assumes the groove-engaging position and as the clutch member 113 rotates, it is moved longitudinally outward on shaft 62 until the dog 114 no longer engages lug 61a, and shaft 62 ceases to rotate.

Figures 15, 16, 17:
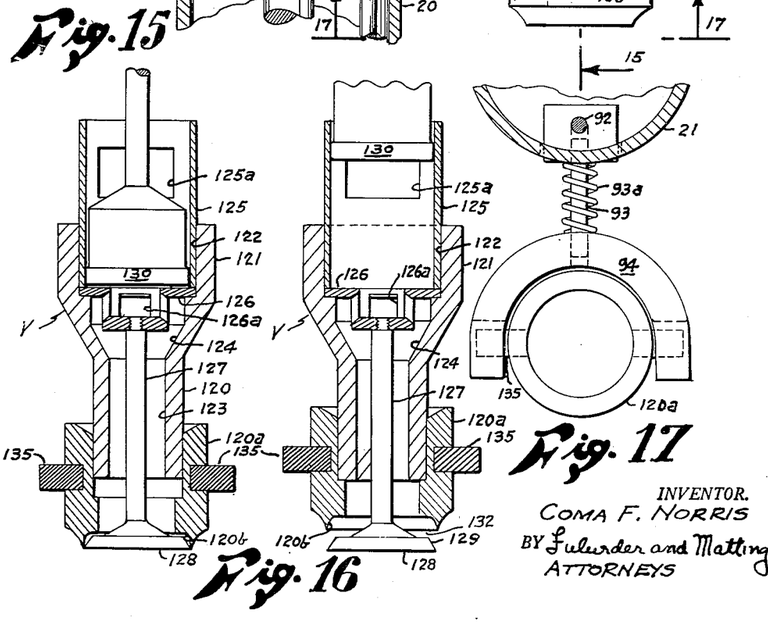
Figure 15 is a vertical cross-sectional view of the doughnut forming valve taken on line 15—15 of Figure 14.
Figure 16 is a vertical cross-sectional view of the doughnut forming valve in a doughnut ejecting position.
Figure 17 is a bottom plan view of the doughnut forming valve looking upwardly from the line 17—17 of Figure 14.

As may best be seen in Figures 14 to 17, valve V includes a tubular member 120 having an enlarged head portion 121 through which a bore 122 extends. A counterbore 123 extends upwardly through the lower portion of member 120, and it is seen that between bore 122 and counterbore 123 a somewhat conical bore 124 is formed at the junction. A cylinder 125 is disposed in bore 122, and has a bottom 126 from which a rod 127 projects downwardly, said rod on the lower end extending into an annular plate 128. Plate 128 is disposed below the lower edge of a tubular sleeve 120a that is slidably mounted on the lower exterior surface of member 120. The outer circumferential surface 129 of the plate tapers upwardly and inwardly and is complementary to the lower end 120b of tubular member 120a. A rectangular port 125a is formed in the upper side wall of cylinder 125 whereby when the piston 130 within the cylinder is moved upwardly a vacuum is created within the valve V, drawing dough through port 125a into the confines thereof. On the downstroke of piston 130, the portion of the dough within cylinder 120 below the lower edge of port 125a is forced downwardly to be discharged through an aperture 126a formed in the cylinder bottom 126. The downward movement of this newly-admitted dough, forces the dough already disposed in bore 123 downwardly, and a portion of it is extruded in a doughnut shape through the annulus shaped space 132 existing between the complementary faces 129 and 120b as shown in Figure 16.

Piston 130 is supported at the lower end of a rod 133 threadedly engaged into the arm 91 projecting outwardly from rod 88. As rod 88 is reciprocated by mechanism M, dough is admitted into and discharged from tubular member 120. The sleeve 120a is provided with two oppositely disposed pins 135 that are engaged by notches 136 formed in the spring-loaded jaw 94 (see Figures 14 and 17).

The movement of rods 88 and 92 is such that as the piston 130 forces dough downwardly in tubular member 120, the sleeve 120a is moved upwardly to cause extrusion of the dough in doughnut shape. Each doughnut so formed is separated from valve V by movement of sleeve 120a which brings the complementary surfaces 120b and 129 together into a doughnut severing position (Figure 16).

The present invention is preferably supplied with electrical energy by two insulated conductors 140 extending therefrom to a source of domestic power (not shown). Conductors 140 terminate at a timer 141 of conventional design, and insulated electrical conductors 142a lead from timer 141 to a junction box 142. Insulated electrical conductors 143 and 144 also lead from box 142 to motor 58 and the air conditioning unit U respectively. Heating element 46 and a thermostat 145 having a bulb 146 normally immersed in the bath of grease, or so arranged as to indicate the temperature of the grease, are connected in series to box 142 by two conductors 147 and 148 respectively.

Two incandescent bulbs 149 and 149a located in the forwardly disposed corners of cabinet C above base plate 35, illuminate the doughnut forming and frying portions of the invention, and are connected to junction box 142 by means of insulated conductors 150.

From the above description it is seen that by setting the timer 141, the dispensing device of the present invention may be actuated and stopped at any particular time without personal supervision.

During the time the present invention is electrically energized by current flowing from junction box 142, it may be actuated by depositing a coin of predetermined value into slot S. The slot is a part of a coin-receiving unit 160 that is preferably provided with a slug rejector (not shown). When a coin is deposited in slot S, a jack switch 161, one terminal of which is connected by conductors 162 and 163 to junction box 142, is closed. The other terminal of switch 161 is connected by conductors 164 and 165 to one of the contacts 166 of a double pole, single throw relay 167 and its solenoid 167a. A conductor 168 extends from the other contact 169 of relay 167 to one of the poles 118a of solenoid 118. Terminal 118b of the solenoid is connected by conductors 170 and 171 to switch 110. The electrical circuit from switch 110 to junction box 142 is completed by a conductor 172. Relay 167 has two armatures 180 and 181 that are connected to a conductor 182 extending to junction point 163a. When the relay is actuated, the armatures 180 and 181 engage contact points 166 and 169 respectively.

The use and operation of the invention is quite simple. After the device is installed in the desired location and connected to a source of electrical energy, the timer 141 is set to automatically energize the electrical circuit to cause the device to operate for any desired period of time (shown in Figure 18). In some locations such as railway and bus terminals, and in certain industrial plants, the timer 141 may be eliminated, as the dispensing device may continuously operate at a profit on a twenty-four-hour basis if desired.

When a coin of the appropriate denomination is deposited in the slot S, and when the machine is in an operating condition, the normally open jack switch 161 is momentarily closed, at which time an electrical circuit is completed to energize solenoid 167a. The circuit to solenoid 167a from box 142 includes conductor 163, junction 163a, conductor 162, switch 161, conductor 164, junction 164a, conductor 179, and conductor 174, junction 171a, conductor 171, normally closed micro-switch 110, and conductor 172.

The energization of holding relay 167 completes two circuits. The first circuit supplies electricity from junction box 142 to energize solenoid 167a and maintain relay 167 in the closed position after the jack switch 161 assumes its normally open position. This relay-holding circuit includes conductor 182 through which electrical energy flows from junction 163a to armature 180, and then through contact 166, conductor 165, junction 164a and conductor 179 to one terminal of solenoid 167a. The other terminal of solenoid 167a is connected by conductor 174, junction 171a, conductor 171, micro-switch 110 and conductor 172, to the junction box 142. Thus, it will be seen that relay 167 will remain closed so long as micro-switch 110 remains in the closed position.

The second circuit is completed upon energization of relay 167, and in turn the clutch controlling solenoid 118. Solenoid 118 has one terminal 118a connected to the conductor 168 extending to contact 169, which is actuated when relay 167 is engaged by armature 181. The armature is connected by conductor 182, junction point 163a, and conductor 163 to junction box 142. The other solenoid terminal 118b is connected by conductor 170, junction point 171a, conductor 171, micro-switch 110, and conductor 172 to junction box 142.

The above described portion of the electrical circuit controls the part of the mechanism M that operates intermittently. The motor 58, air conditioning unit U, incandescent bulbs 149 and 149a function continuously between the time limits defined by operation of timer 141. Heating element 46 also functions continuously when the invention is in an operating condition to maintain the grease in pan P at a predetermined temperature, but with its operation periodically interrupted by action of thermostat 145 when the grease temperature reaches the maximum for which the thermostat is set.

With the motor 58 actuated, the cam 64, shown in detail in Figure 8, rotates continuously to reciprocate the rods 70 and 71a. Each complete reciprocating cycle of rods 70 and 71a results in the raising and lowering of the baskets 75 and 78 as described. The upward pivotal movement of basket 75 lifts a doughnut from the grease in pan P if it should be in the outer portion of one of the openings 53 which at that particular time is in vertical alignment with the basket. When a doughnut is so lifted from the grease, the movement of the basket is such that substantially all of the grease drains from the doughnut before it is discharged from the basket into a chute 190 extending downwardly to terminate in an enclosure 191 formed in door 14, as may best be seen in Figure 1.

At the time a coin is deposited in the slot, the customer removes a bag 192 from a suitable receptacle 193 also positioned on door 14, and places the bag in a doughnut-receiving position in the enclosure 191. Access to enclosure 191 is preferably provided by a hinged transparent door 195. The door 195 is normally maintained in a closed position by spring means or the like, and must be manually opened for insertion or removal of a bag 192 therefrom. Concurrent with the movement of basket 75 in removing cooked doughnuts from the pan P, basket 78 transfers the partially cooked doughnuts as they completely traverse the inner channel 47, to the outer channel 48 for further cooking.

Cam 64 serves a dual purpose, for in addition to actuating rods 70 and 71a, the pin 80 mounted thereon engages the slotted Geneva movement member 81 each time the cam rotates. Each revolution of cam 64 results in a quarter revolution of member 81 which is such that the doughnut-moving plate R is rotated in steps. The intermittent movement of annular plate R is synchronized with the pivotal movement of baskets 75 and 78, and each step rotation of plate R is sufficient to bring the next in line of the doughnut moving openings 53 into vertical alignment with the baskets. The step rotation of doughnut-moving plate R by Geneva member 81 is also synchronized with the reciprocating rods 70 and 71a in such a manner that this plate rotation occurs when the baskets are disposed below the lower face of the plate (Figures 12 and 13).

Figure 18:
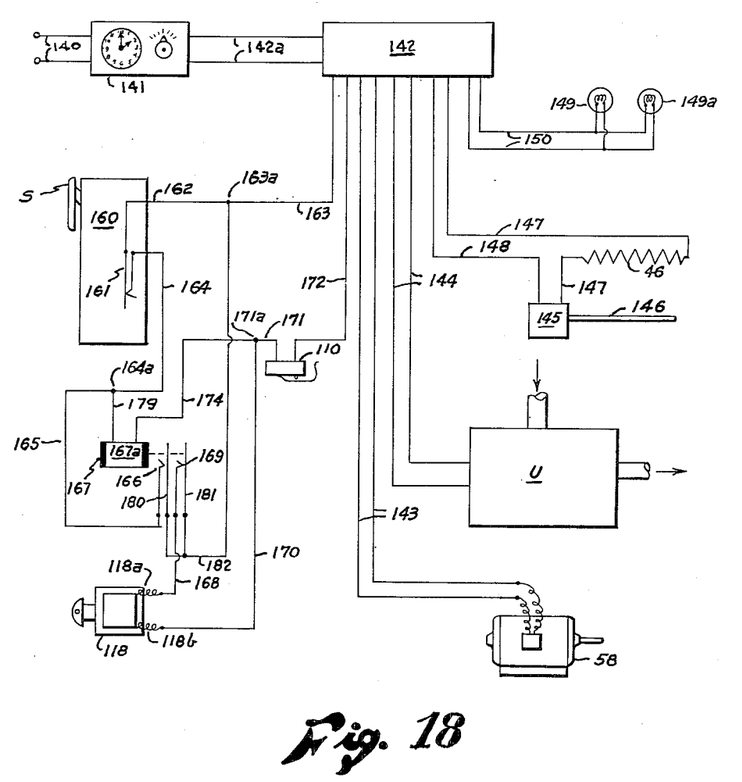
Figure 18 is the wiring diagram used in supplying electrical energy to the various component parts of my invention.

Although it has been convenient to first consider the cooking of the doughnuts and their removal from pan P, due to the mechanical nature of the mechanism, the initial operation of the device after a coin is deposited in slot S is to energize solenoid 118 by closing relay 167 due to completion of a portion of the circuit, as shown in Figure 18, and previously described herein. Energization of solenoid 118 pivots lever 117 outwardly from its engagement with groove 115 to permit the dog clutch assembly (Figures 5 and 10) to rotate the previously stationary shaft 62. Rotation of shaft 62 in turn rotates cams 86 and 87, and the reciprocating rods 88 and 92 actuate valve V. Each time the rods 88 and 92 complete a reciprocative cycle, valve V is actuated to form and discharge a doughnut into pan P. The reciprocation of rods 88 and 92 is synchronized with the step rotation of doughnut-moving plate R in such a manner that the newly formed doughnut is discharged into the inner end portion of one of the openings 53 when plate R is at rest. The next doughnut is not discharged from valve V into the pan P until the plate is rotated another step to bring the next in line of the openings 53 in vertical alignment with the valve V, as shown by dotted line in Figure 11.

Each rotation made by cams 86 and 87 in actuating valve V to form a doughnut also causes actuation of the second Geneva member 106. Advancement of member 106 occurs concurrently with the formation and discharge of each doughnut by the valve. De-energization of solenoid 118 causes lever 117 to engage slot 115, and the clutch member 108 moves to a position whereby shaft 62 is no longer driven. Formation of doughnuts by valve V ceases with de-energization of solenoid 118, as the valve is actuated by rotation of the shaft 62.

Although the invention is illustrated and described herein as a coin-operated vending machine, it will be apparent that the device may be manually actuated, or arranged for continuous or intermittent operation, depending on the particular market it is to serve.

While the invention hereinabove described is fully capable of achieving the objects and providing the advantages hereinbefore mentioned, it is to be clearly understood that this is merely the present embodiment of the invention, and that it is not to be limited to the details of construction herein shown and described other than as defined by the appended claims.

I claim:

1. An apparatus for use in forming at will a predetermined quantity of mass dough into a plurality of doughnuts which are fried after being so formed without fumes from said frying contaminating the atmosphere of the quarters in which said apparatus may be housed, including: a cabinet having a transparent upper portion; a pan in which liquid grease can be held, said pan being positioned in said cabinet below said transparent portion; a container in which dough can be disposed, which container is situated at an elevated position above said pan and inside said cabinet; means to discharge said predetermined quantity of dough in the form of doughnuts from said container into said pan; means to actuate said discharge means; a first shell surrounding said container and spaced outwardly therefrom to provide an air passage; refrigerating means for cooling air passing therethrough; closed conduit means connecting said air passage and said refrigerating means to subject said dough container to cooled air; means for heating said grease in said pan; a second shell surrounding said first shell and spaced outwardly therefrom to define an air space therebetween that acts as an insulator to prevent cooling of said second shell to the extent that vaporized grease from said pan will deposit in solid form thereon; means for moving said doughnuts after they are deposited in said pan; means for dispensing said doughnuts to the exterior of said cabinet after they have traversed a predetermined distance in said pan; an electrically operated blower disposed in the upper portion of said cabinet that continuously discharges air as well as hot grease fumes immediately after formation thereof from the interior of said cabinet through an opening formed in said cabinet; and a perforated receptacle communicating with said opening, which receptacle contains a grease fume absorbing material through which said discharged air passes prior to entering the surrounding atmosphere.

2. An apparatus as defined in claim 1 in which said cabinet is rectangular in shape, having portions cut out from the upper part thereof in which sheets of transparent material are mounted to permit visual observation of the frying operation.

References Cited in the file of this patent

UNITED STATES PATENTS

| | | |
|---|---|---|
| 1,492,541 | Bergner | Apr. 29, 1924 |
| 1,492,542 | Bergner | Apr. 29, 1924 |
| 1,559,729 | Morris | Nov. 3, 1925 |
| 1,716,266 | Flamm | June 4, 1929 |
| 1,749,414 | Christianson | Mar. 4, 1930 |
| 1,768,737 | Bergner | July 1, 1930 |
| 1,817,887 | Hunter | Aug. 4, 1931 |
| 1,889,406 | Goldschmidt | Nov. 29, 1932 |
| 1,940,071 | Brand | Dec. 19, 1933 |
| 2,077,395 | Chapel | Apr. 20, 1937 |
| 2,083,829 | Carpenter | June 15, 1937 |
| 2,108,627 | Tyler | Feb. 15, 1938 |
| 2,273,595 | Roth | Feb. 17, 1942 |
| 2,501,712 | Chodziesner | Mar. 28, 1950 |
| 2,511,826 | Schmitt | June 13, 1950 |
| 2,531,238 | Tandler et al. | Nov. 21, 1950 |
| 2,600,075 | Roth | June 10, 1952 |
| 2,608,940 | Nagel et al. | Sept. 2, 1952 |
| 2,657,627 | Lindstrom et al. | Nov. 3, 1953 |